US008533129B2

(12) United States Patent
Kejariwal et al.

(10) Patent No.: US 8,533,129 B2
(45) Date of Patent: Sep. 10, 2013

(54) EFFICIENT DATA LAYOUT TECHNIQUES FOR FAST MACHINE LEARNING-BASED DOCUMENT RANKING

(75) Inventors: Arun Kejariwal, San Jose, CA (US); Girish Vaitheeswaran, Fremont, CA (US); Sapan Panigrahi, Castro Valley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1371 days.

(21) Appl. No.: 12/211,636

(22) Filed: Sep. 16, 2008

(65) Prior Publication Data
US 2010/0070457 A1 Mar. 18, 2010

(51) Int. Cl.
*G06F 15/18* (2006.01)

(52) U.S. Cl.
USPC ............................................................ 706/12

(58) Field of Classification Search
USPC ............................................................ 706/12
See application file for complete search history.

(56) References Cited

U.S. PATENT DOCUMENTS

| 4,284,846 | A | * | 8/1981 | Marley | 704/253 |
| 5,933,643 | A | * | 8/1999 | Holler | 717/158 |
| 6,286,064 | B1 | * | 9/2001 | King et al. | 710/67 |
| 6,307,548 | B1 | * | 10/2001 | Flinchem et al. | 715/811 |
| 6,646,573 | B1 | * | 11/2003 | Kushler et al. | 341/28 |
| 6,751,600 | B1 | * | 6/2004 | Wolin | 706/12 |
| 6,971,018 | B1 | * | 11/2005 | Witt et al. | 713/187 |
| 7,272,587 | B1 | * | 9/2007 | Przytula | 706/52 |
| 7,275,029 | B1 | * | 9/2007 | Gao et al. | 704/9 |
| 8,090,724 | B1 | * | 1/2012 | Welch et al. | 707/750 |
| 8,160,914 | B1 | * | 4/2012 | Karipides | 705/7.29 |
| 2009/0024568 | A1 | * | 1/2009 | Al-Omari et al. | 707/2 |
| 2010/0057800 | A1 | * | 3/2010 | Hawking | 707/728 |

OTHER PUBLICATIONS

Safavian, S.R. et al. "A Survey of Decision Tree Classifier Methodology", IEEE Transactions on Systems, Man, and Cybernetics, vol. 21, No. 3, May/Jun. 1991, pp. 660-674.*
Ruggieri, S. "Efficient C4.5", IEEE Transactions on Knowledge and Data Engineering, vol. 14, No. 2, Mar./Apr. 2002, pp. 438-444.*
Coppersmith, D. et al. "Patritioning Nominal Attributes in Decision Trees", Data Mining and Knowledge Discovery 3, 1999, pp. 197-217.*
Williams, H.E. et al. "Self-adjusting trees in practice for large text collections". Software—Practice and Experience. 2001; vol. 31. pp. 925-939. DOI: 10.1002/spe.394.*

(Continued)

*Primary Examiner* — Jeffrey A Gaffin
*Assistant Examiner* — Benjamin Buss
(74) *Attorney, Agent, or Firm* — James J. DeCarlo; Greenberg Traurig, LLP

(57) ABSTRACT

A computer readable medium stores a program for optimization for a search, and has sets of instructions for receiving a first decision tree. The first decision tree includes several nodes, and each node is for comparing a feature value to a threshold value. The instructions are for weighting the nodes within the first decision tree, determining the weighted frequency of a first feature within the first decision tree, and determining the weighted frequency of a second feature within the first decision tree. The instructions order the features based on the determined weighted frequencies, and store the ordering such that values of features having higher weighted frequencies are retrieved more often than values of features having lower weighted frequencies within the first decision tree.

18 Claims, 10 Drawing Sheets

(56) References Cited

OTHER PUBLICATIONS

Cho, Y.H. et al. "A personalized recommender system based on web usage mining and decision tree induction". Expert Systems with Applications vol. 23 (2002) pp. 329-342.*

Sleator, D.D. et al. "Self-Adjusting Binary Search Trees". Journal of the Association for Computing Machinery, vol. 32, No. 3, Jul. 1985. pp. 652-686.*

Bell, J. et al. "An Evaluation of Self-adjusting Binary Search Tree Techniques". Software—Practice and Experience, vol. 23, No. 4. pp. 369-382. Apr. 1993.*

* cited by examiner

EFFICIENT DATA LAYOUT TECHNIQUES FOR FAST MACHINE LEARNING-BASED DOCUMENT RANKING

FIELD

The present invention is related to the field of search, and is more specifically directed to efficient data layout techniques for fast machine learning-based document ranking.

BACKGROUND

Web search and content-based advertising are two important applications of the Internet. One important component of web search, and of some content-based advertising systems, is document ranking in which relevant documents, e.g. web documents or advertisements, are ranked with respect to a given query or content. Several advanced ranking techniques are in development to improve search result and advertising match accuracy.

During recent years, various search engines have been developed to facilitate searching information, products, services, and the like, over the world-wide web. One of the key components of a search engine, from a user experience perspective, is ranking the "relevant" documents that are displayed in response to a query specified by the user. Document ranking is done based on a multitude of metrics such as degree of query match and freshness of the document. One type of advanced document ranking incorporates implicit feedback and a large number of document features, which helps to improve the "quality" of the search results. This type of advanced document ranking, however, adversely affects the query processing time due to the CPU intensive nature of the document ranking process. Hence, in many cases, such advanced techniques are computationally intensive and thus cannot be deployed in production, which in turn limits the scope of improvements to search ranking and content-based advertising.

SUMMARY

A bottom-up optimization methodology guides the identification of bottlenecks in a production strength "machine learning-based ranking" (MLR) library. Some embodiments further mitigate the impact of the bottlenecks on existing hardware by using various optimizations that are pre-compiled for execution. The optimizations performed are transparent to the designer of the MLR library and the programmer. More specifically, inputs to the optimization scheme are the MLR library implementation and the target hardware platform. The output of the optimization scheme is a further optimized MLR library. Some implementations perform about ten percent faster than a baseline or conventional search library. Moreover, some embodiments address a trade-off between improved ranking for search results and processing time, with respect to end-user search experience. Some of these embodiments implement novel data layouts that are enhanced to optimize the run-time performance of document ranking. Further, these embodiments advantageously enable advanced document ranking without adversely impacting the query processing time.

In a particular implementation, a method of optimization for a search receives a first decision tree. The first decision tree has several nodes. Each node is for comparing a feature value to a threshold value. The decision tree has feature values that are numerical values describing a document in terms of a set of features or attributes assigned to the document. The method determines the frequency of a first feature within the first decision tree, and determines the frequency of a second feature within the first decision tree. The method orders the features of the decision tree based on the determined frequencies of the features, and stores the ordering such that values of features having higher frequencies are retrieved more often than values of features having lower frequencies, within the first decision tree.

Preferably, the first decision tree is derived from a machine learning-based ranking algorithm. Also preferably, the method operates on a set of multiple decision trees including the first decision tree, by determining the frequency of the first feature in and/or across the set of decision trees. The determined frequencies generally include static frequencies at compile time, and the ordering is performed at compile time. In particular embodiments, the storing involves grouping the higher frequency feature values into memory blocks that are closely packed such that higher frequency feature values are loaded more often into cache from memory. The method compiles the nodes of the first decision tree into a run time algorithm such that the higher frequency feature values are retrieved at run time by prefetching. The first decision tree includes a root node, a plurality of internal nodes, and at least one leaf node. The features within the first decision tree are representative of the features of a web page document available for searching online, and the feature values are used to rank the web page document based on a calculated relevance to a search query.

Alternatively, a method of optimization for a search receives a first decision tree. The first decision tree has several nodes, and each node is for comparing a feature value to a threshold value. The decision tree has feature values that are numerical values describing a document in terms of a set of features or attributes assigned to the document. The method weights the nodes within the first decision tree, and determines the weighted frequency of a first feature within the first decision tree. The method determines the weighted frequency of a second feature within the first decision tree, and orders the features based on the determined weighted frequencies. The method stores the ordering such that values of features having higher weighted frequencies are retrieved more often than values of features having lower weighted frequencies, within the first decision tree.

Preferably, the first decision tree is derived from a machine learning-based ranking algorithm. Also preferably, the method operates upon a set of decision trees including the first decision tree such as by weighting the nodes for each decision tree, and determining the weighted frequency of the first feature in and/or across the set of decision trees. The determined frequencies generally include static frequencies at compile time, and the ordering is advantageously performed at compile time, thereby not adversely affecting the CPU processing time of the decision trees. In a particular embodiment, the storing groups feature values for higher frequency features into memory blocks that are closely packed such that the higher frequency feature values are loaded more often into cache from memory. Some embodiments compile the nodes of the first decision tree into a run time algorithm such that the higher frequency feature values are retrieved at run time by prefetching. The first decision tree generally includes a root node, several internal nodes, and at least one leaf node. The root node and each internal node comprises a binary decision node, in which the decision preferably involves a Boolean expression of whether a particular feature value $F_n$ is less than a threshold value for the node. In one implementation, if the Boolean expression is true, then the tree is traversed in the direction of one of two next nodes within the first decision tree. The features within the first decision tree are representative of the features of a web page document available for searching online, and the feature values are used to rank the web page document based on a calculated relevance to a search query. Some embodiments assign higher weights to the nodes closer to a root node. The first decision tree of a particular implementation includes one root node, fifteen internal nodes, and sixteen leaf nodes organized into layers having node weights. In these implementations, the layer of nodes having the root node may be assigned the highest weight, and the layer of nodes having one or more leaf nodes comprises a layer of nodes having the lowest weighted nodes.

A computer readable medium stores a program for optimization for a search, and has sets of instructions for receiving a first decision tree. The first decision tree includes several nodes, and each node is for comparing a feature value to a threshold value. The instructions are for determining the frequency of a first feature within the first decision tree, and for determining the frequency of a second feature within the first decision tree. The instructions order the features based on the determined frequencies, and store the ordering such that values of features having higher frequencies are retrieved more often than values of features having lower frequencies, within the first decision tree.

A computer readable medium, of a further embodiment, stores a program for optimization for a search, and has sets of instructions for receiving a first decision tree. The first decision tree includes several nodes, and each node is for comparing a feature value to a threshold value. The instructions are for weighting the nodes within the first decision tree, determining the weighted frequency of a first feature within the first decision tree, and determining the weighted frequency of a second feature within the first decision tree. The instructions order the features based on the determined weighted frequencies, and store the ordering such that values of features having higher weighted frequencies are retrieved more often than values of features having lower weighted frequencies within the first decision tree.

BRIEF DESCRIPTION OF THE FIGURES

The novel features of the invention are set forth in the appended claims. However, for purpose of explanation, several embodiments of the invention are set forth in the following figures.

DETAILED DESCRIPTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Document Ranking in Web Search and Advertising

Figure 1:
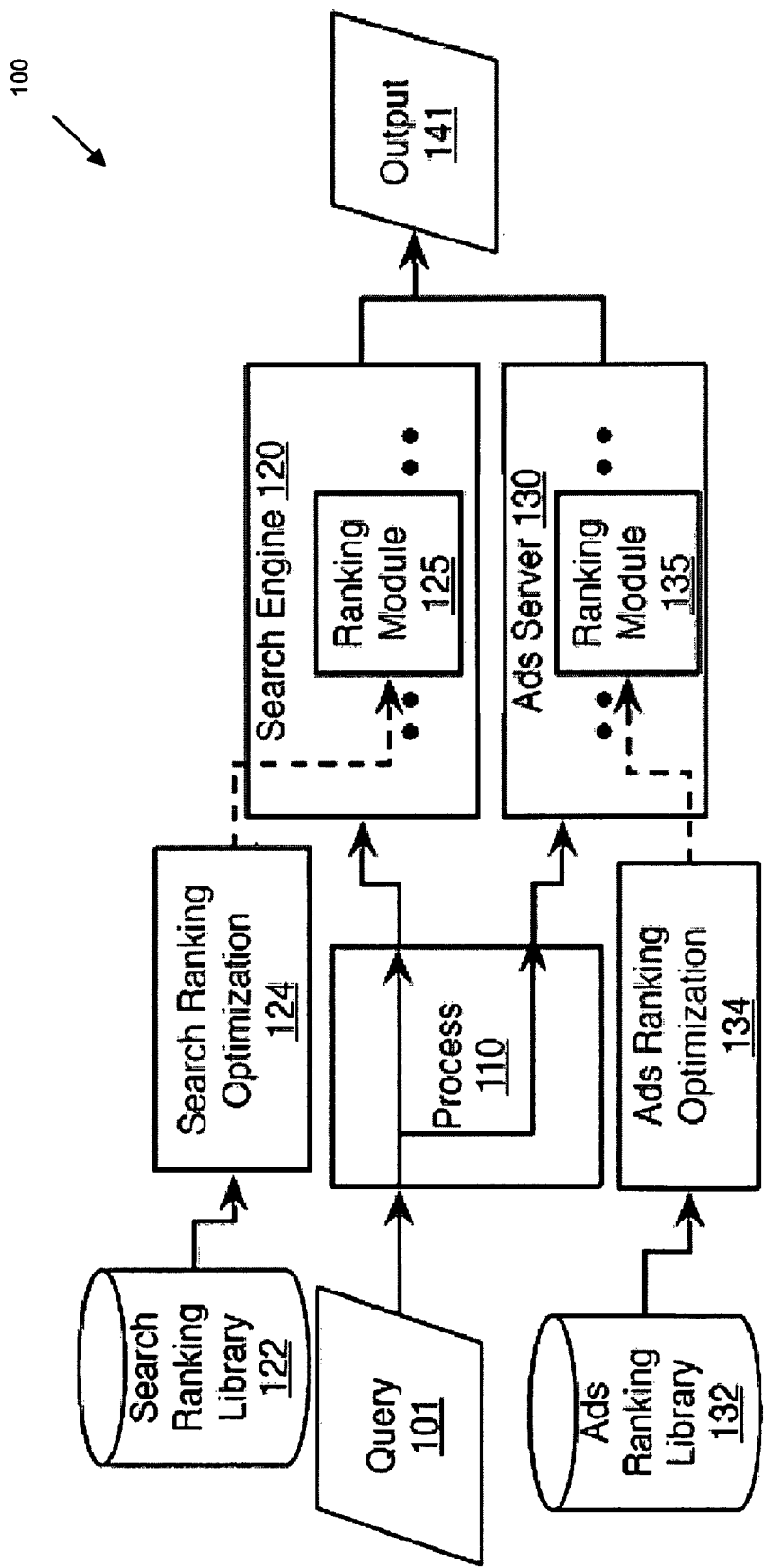
FIG. 1 illustrates a process for document ranking such as to serve search results and/or advertising based on ranking elements consistent with some embodiments of the invention.

FIG. 1 illustrates a flow 100 by which a search results page comprising ranked elements is generated in response to a search query. As shown in this figure, a query 101 is received by a process 110, which performs preprocessing operations to produce a processed query. Desirable preprocessing operations include filtering, sanitization, stemming, stop-word removal, and canonical format conversion. Typically, the processed query is provided to two separate sub-process pipelines. For instance, a search engine pipeline 120 selects relevant web content, which is usually referenced by a URL or URI on the World-Wide-Web, and ranks the content in order of relevance to the pre-processed query. This ranking may form the final algorithmic search results set for the query. In some cases, an ads pipeline 130 performs ranking for advertisements, which are generally text-based and/or graphical type advertisements. The ranking of advertisements is also preferably in order of relevance to the pre-processed query. Typically, the rankings determine selection and/or placement of advertisements and/or search results within one or more results page(s).

In some embodiments, the ranking of web content within the search engine pipeline 120 is performed by a web-ranking module 125. Other modules within the search engine pipeline may perform selection. Furthermore, the web ranking module 125 preferably employs one or more optimizations of a machine learning-based ranking that may be stored in an MLR library. For instance, in the present example, the machine learning-based ranking is advantageously stored in search ranking library 122. In some of these instances, the machine learning-based ranking is more specifically implemented as a sequence of decision trees. A search ranking optimization module 124 optimizes the machine learning-based ranking from the search ranking library 122, and provides an optimized MLR to the ranking module 125. Preferably, the optimization processes occur offline, e.g. during compilation of search ranking library 122 to form machine code. Accordingly, the web ranking module 125 may be embodied as machine code. Furthermore, optimization within the search ranking optimization module 125 preferably proceeds by using certain optimized data layout(s) consistent with the embodiments further described herein.

Similarly, within the ads serving pipeline 130, ranking of ads is performed by ads ranking module 135. In some embodiments, other modules within the search engine pipeline perform selection. Furthermore, the ads ranking module 135 of some instances, employs an optimization of a machine learning-based ranking. The ranking may be stored in a library format such as the search ranking library 132. Preferably, the machine learning-based ranking is implemented as a sequence of decision trees. An ads ranking optimization module 134 optimizes the machine learning-based ranking from the ads ranking library 132, and provides a further optimized (machine learned) ranking to a ranking module 135. Preferably, the optimization processes occur offline, e.g. during compilation of the ads ranking library 132 to form machine code, and the ads ranking module 135 may be partially or fully embodied as machine code, as needed. Furthermore, optimization within the ads ranking optimization module 135 preferably proceeds by using one or more of the implementations described herein.

An output 141, e.g. a search results page, that is delivered in response to the query 101 may draw upon rankings produced by both the ads serving pipeline 130 and/or the search engine pipeline 120. As recognized by one of ordinary skill, the presentation of ranked search results has a variety of forms and/or advantages. For instance, a user who inputs a search query may advantageously receive a listing of the top five or ten documents by rank, score, and/or relevance, in response to the user requested and/or instantiated search query.

Machine Learning-Based Ranking (MLR) Optimization

The exemplary code below illustrates a process that optimizes a machine learning-based ranking library. As shown in this exemplary document ranking algorithm, the score of a document is incremented in an iterative fashion.

for each decision tree representing the features of a document relating to a search query;
   traverse each decision tree until a leaf node is reached;
   determine the partial document score at the leaf node;
   update the total document score using the partial document score;
end for;

In the pseudo code above, each iteration of the outer for-loop involves traversing a decision tree. Upon reaching a leaf node, the total score of a document that is associated with the decision tree is incremented by the value stored in the leaf node, or a partial document score. In some embodiments, each tree is a binary tree consisting of 15 internal nodes and 16 leaf nodes. Accordingly, the decision tree of these embodiments is preferably an unbalanced binary tree. In a particular embodiment, each internal node of a tree consists of an evaluation of the form:

$$\text{Value}(\text{Feature}_i) < \text{Threshold Value}$$

where $\text{Value}(\text{Feature}_i)$ is the value of $\text{Feature}_i$ for a given document. A particular feature $\text{Feature}_i$ may be used in multiple internal nodes of a given tree, though the corresponding threshold values in the conditionals may be different at each node. The feature values describe features of the particular document such as, for example, whether the document is a news type document, the region of the document, the language, whether the document contains or is a music, a video, and/or a blog type document, and/or how many times does a specific term such as "Brittany" appear in the document and/or web page. One of ordinary skill recognizes many additional document features, and further that such features may number in the hundreds or thousands of features, each having a feature value for describing the document in relation to the feature.

Figure 2:
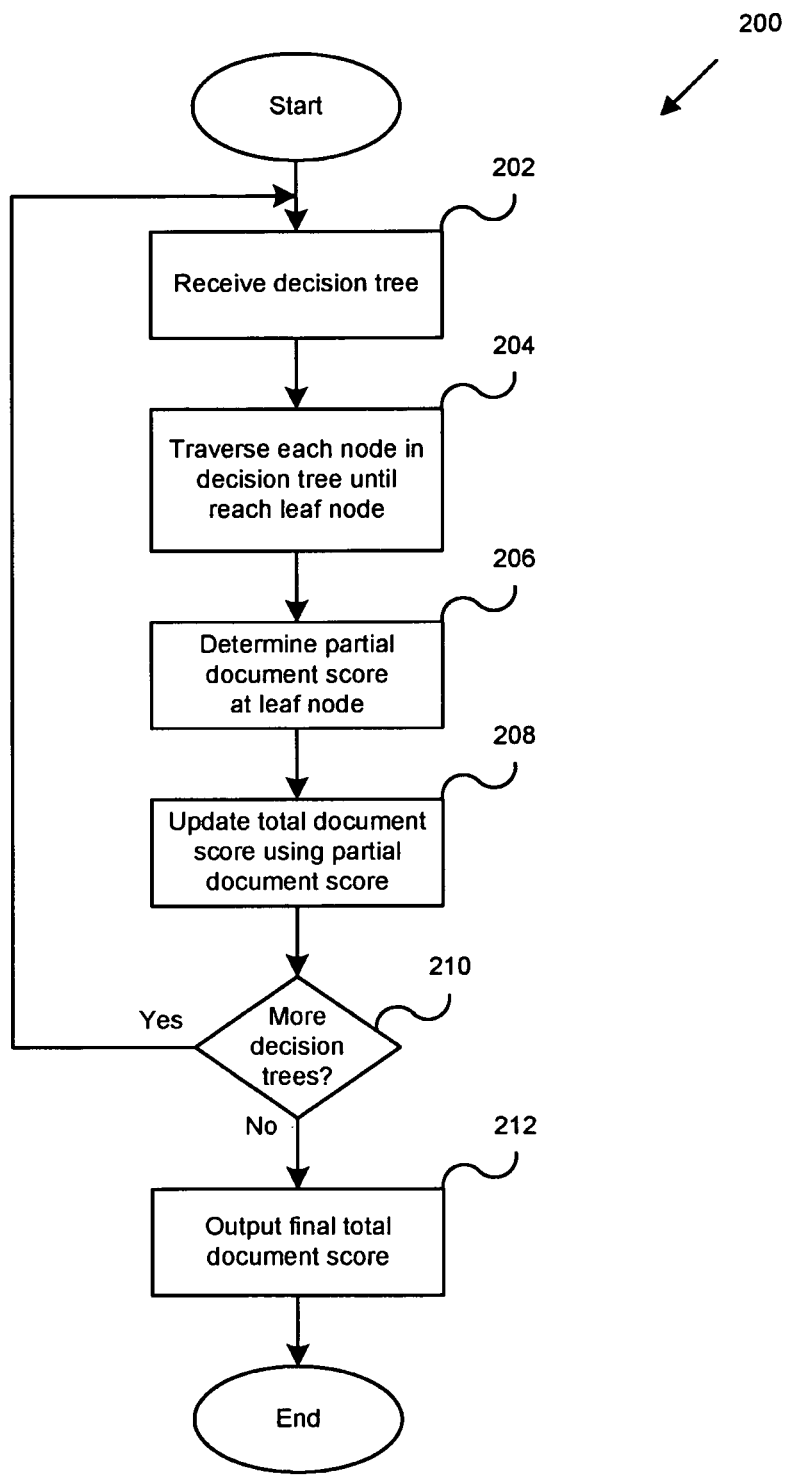
FIG. 2 illustrates a process for scoring and/or ranking a document by using one or more decision trees according to some embodiments.

FIG. 2 illustrates a process 200 for document ranking and/or scoring that summarizes some of the embodiments described above. As shown in this figure, the process 200 begins at the step 202, where a decision tree for a document is received. The decision tree contains a variety of features that describe the document, and a set of values for the features that indicate the relative strength of each feature value. An example decision tree having feature values is further described below in relation to FIG. 3.

Once the decision tree is received, the process 200 transitions to the step 204, where each node in the received decision tree is traversed until a leaf node is reached. The nodes are traversed in order to obtain a document score for the document based on the features, and feature values, of the decision tree for the document. When a leaf node is reached, a partial document score is determined, at the step 206. Then, at the step 208, a total document score is updated by using the partial document score that was determined at the leaf node of the step 206. After the step 208, the process 200 transitions to the step 210, where a determination is made whether there are more decision trees to process and/or score. Generally, a document is described by hundreds or thousands of decision trees. If there are more decision trees to process, then the process 200 returns to the step 202, to receive the next decision tree for processing. Otherwise, the process 200 transitions to the step 212, where a final total score for the document is output. In some implementations, the final total document score includes the sum of the scoring from all the processed decision trees. After the step 212, the process 200 concludes.

Figure 3:
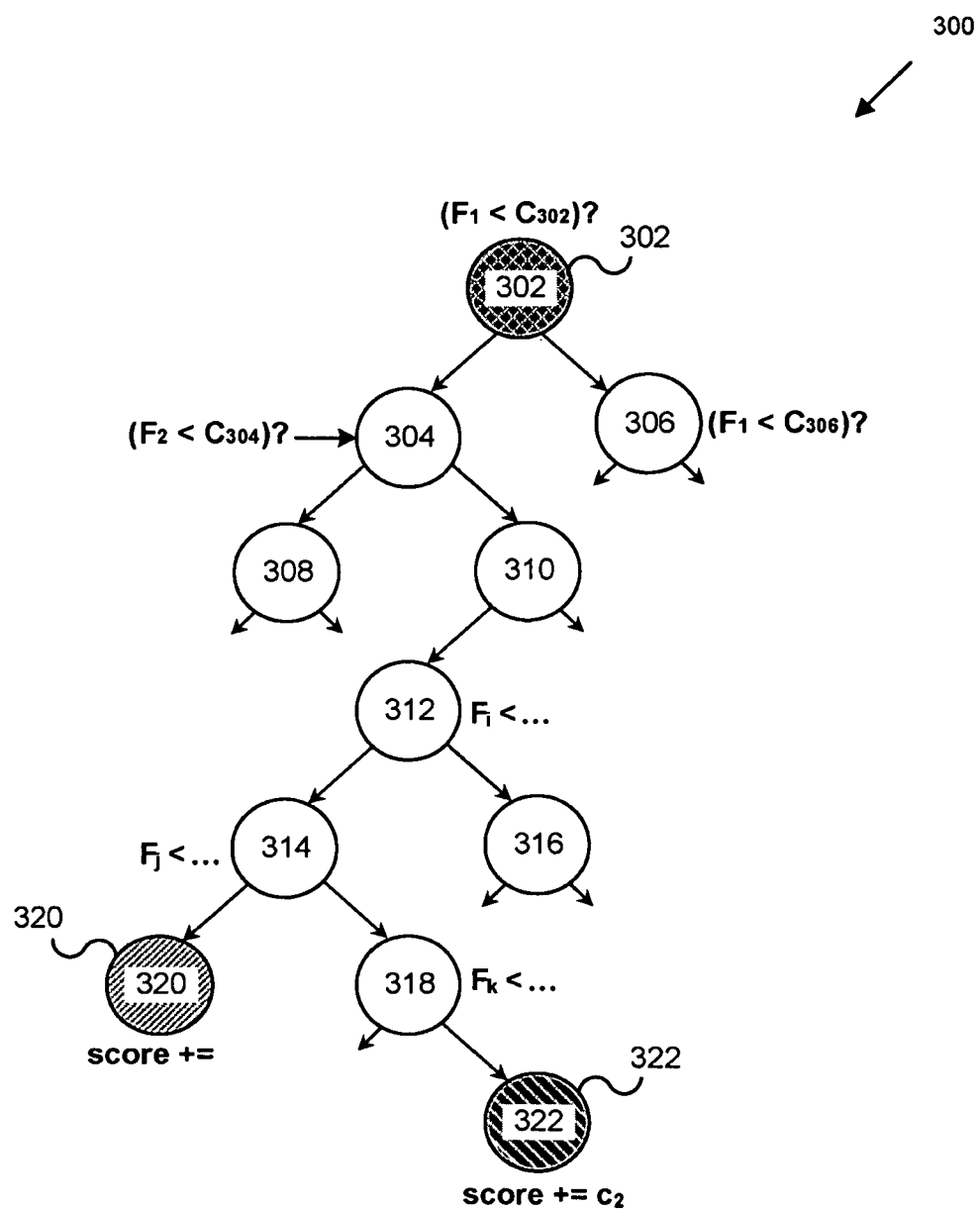
FIG. 3 illustrates a decision tree for document ranking and/or scoring in further detail.

FIG. 3 more specifically illustrates an exemplary decision tree 300 for document ranking. As shown in this figure, the decision tree 300 has a root node 302, several internal nodes 304, 306, 308, 310, 312, 314, 316, 318, and leaf nodes 320 and 322. The root node 302 has cross hatching, the internal nodes 304-318 have no hatching, and the leaf nodes 320 and 322 have diagonal hatching.

At each node, a comparison is made between a feature value and a threshold value or constant to determine the direction of travel. For instance, at the node 302, if the feature value F1 is less than the constant C302, then the process transitions to the node 304. Otherwise, the process transitions to the node 306. Then, at the node 304, if the feature value F2 is less than the constant C304, then the process transitions to the node 308. If the simple Boolean expression at the node 304 is not true, then the processor transitions to the node 310. This tree traversal process continues until a leaf node 320 or 322 is reached. At the leaf node 320 or 322, a partial document score is calculated for the nodes that were traversed or "touched." The partial document scores for each tree are summed to obtain a total document score.

Implementation of Optimization

Using built-in non-intrusive hardware performance counters, one aspect of the invention identifies the hot spots or the bottlenecks that occur during processing of the decision trees such as, for example, the decision tree 300 of FIG. 3. One undesirable processing bottleneck is a level-two (L2) cache miss. Each node within the tree 300 requires retrieval of a feature value for comparison to a constant. The feature values typically require storage and/or retrieval that involve some latency. For instance, the document features and feature values for geographic region, language, blog, and music, may each be stored as a different data type, such as one or more of a float, a string, a bit, and an integer, as examples.

Figure 4:
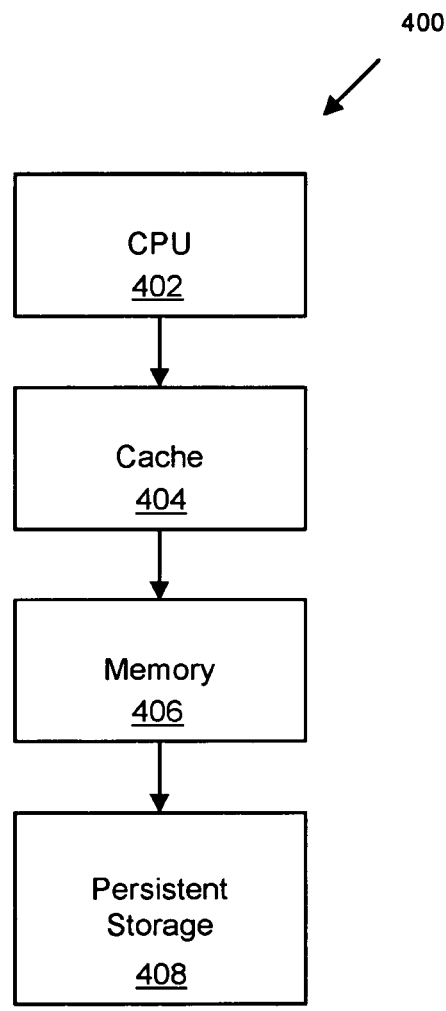
FIG. 4 illustrates a system having a cache and memory configuration in accordance with some embodiments.

FIG. 4 illustrates a processing system 400 of some embodiments. As shown in this figure the system 400 includes a processor (CPU) 402, a cache 404, a memory 406, and a persistent storage 408. The cache 404 preferably includes L2 type cache memory, the memory 406 often includes volatile and/or random access memory, and the persistent storage 408 is typically a disk. The feature values are typically stored in groups or blocks within the persistent storage 408 and the blocks are loaded into the memory 406, and the cache 404, as the individual feature values are needed by the processor 402. As recognized by one of ordinary skill, a cache miss results in undesirable delay from the latency in loading from the memory 406 and/or the persistent storage 408. Prefetching of data, such as feature values, before the data are needed avoids much of the undesirable latency. The size of the cache 404, however, is limited in comparison to the memory 406 and/or the persistent storage 408. Hence, selective prefetching is more desirable.

In view of the foregoing, some embodiments identify the locations within the decision tree 300 that have the highest probability of a cache miss, which further identifies the points of maximum optimization.

I. Static Feature Frequency Based Data Layout

More specifically, some embodiments employ static analysis to determine the frequency of the different document features in the nodes (e.g., internal nodes) of a given set of trees. A feature may be present in multiple internal nodes in a given tree. Also, the trees differ in their structure with respect to conditionals in their respective internal nodes. Consequently, the cumulative frequency of occurrence of the different features in the internal nodes of all the decision trees is non-uniform.

Given a document, the value of each feature of the document is often preferably stored in an array. At run-time, the feature values are read from the array in a "random" order. More specifically, the order is dependent on the path taken in each decision tree which in turn is dependent on the document itself.

Figure 5:
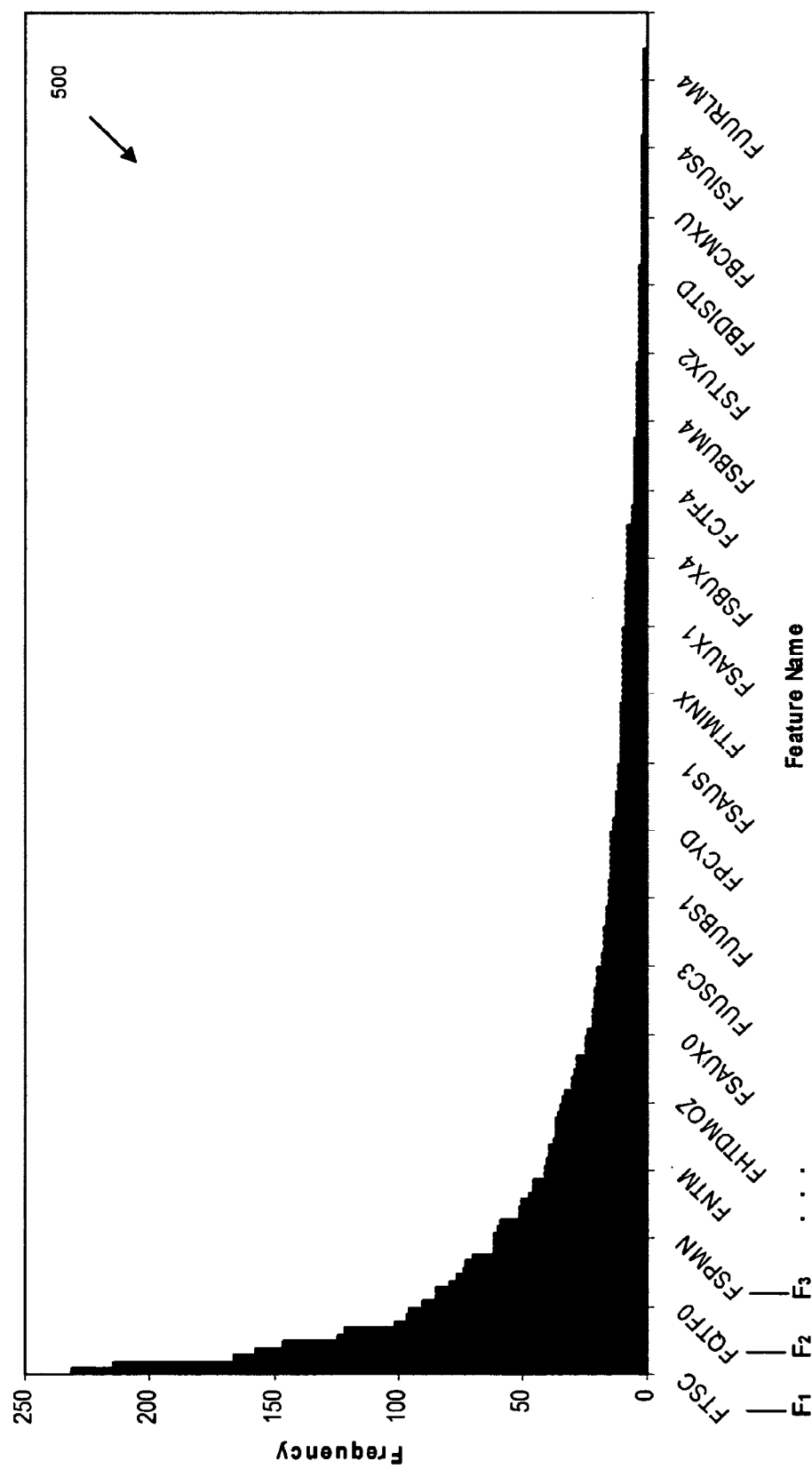
FIG. 5 is a chart that illustrates in descending order the static frequencies of the features in a decision tree of some embodiments.

As an illustration, the frequency of the different features in the first three hundred trees of a machine learning-based library is shown in a chart 500 of FIG. 5. For clarity purposes, the document features along the x-axis are labeled every ten ticks. The feature names along the x-axis are exemplary, and are arbitrarily labeled to F1, F2, F3 . . . , and so forth, for conceptual comparison to the features and feature values of the decision tree 300 of FIG. 3. Moreover, the frequency of each feature across the decision trees shown along the y-axis is also exemplary, and one of ordinary skill recognizes the frequencies of each feature within the decision trees for a particular document may widely vary.

A random access pattern from the feature value comparisons of each decision tree undesirably results in a large number of level-two (L2) cache misses, which adversely affects the run-time performance of the machine learning-based ranking library. In order to mitigate this, some embodiments store the feature values in the array in the order of decreasing feature frequency described and illustrated above in relation to FIG. 5. This reduces the number of L2 cache misses, corresponding to the frequently accessed features, by enhancing data locality and by inducing implicit prefetching. In some implementations, fetching the value of a feature: Value (Feature$_i$), implicitly prefetches:

$$\text{Value}(\text{Feature}_{i+1}) - \text{Value}(\text{Feature}_{i+6})$$

Figure 6:
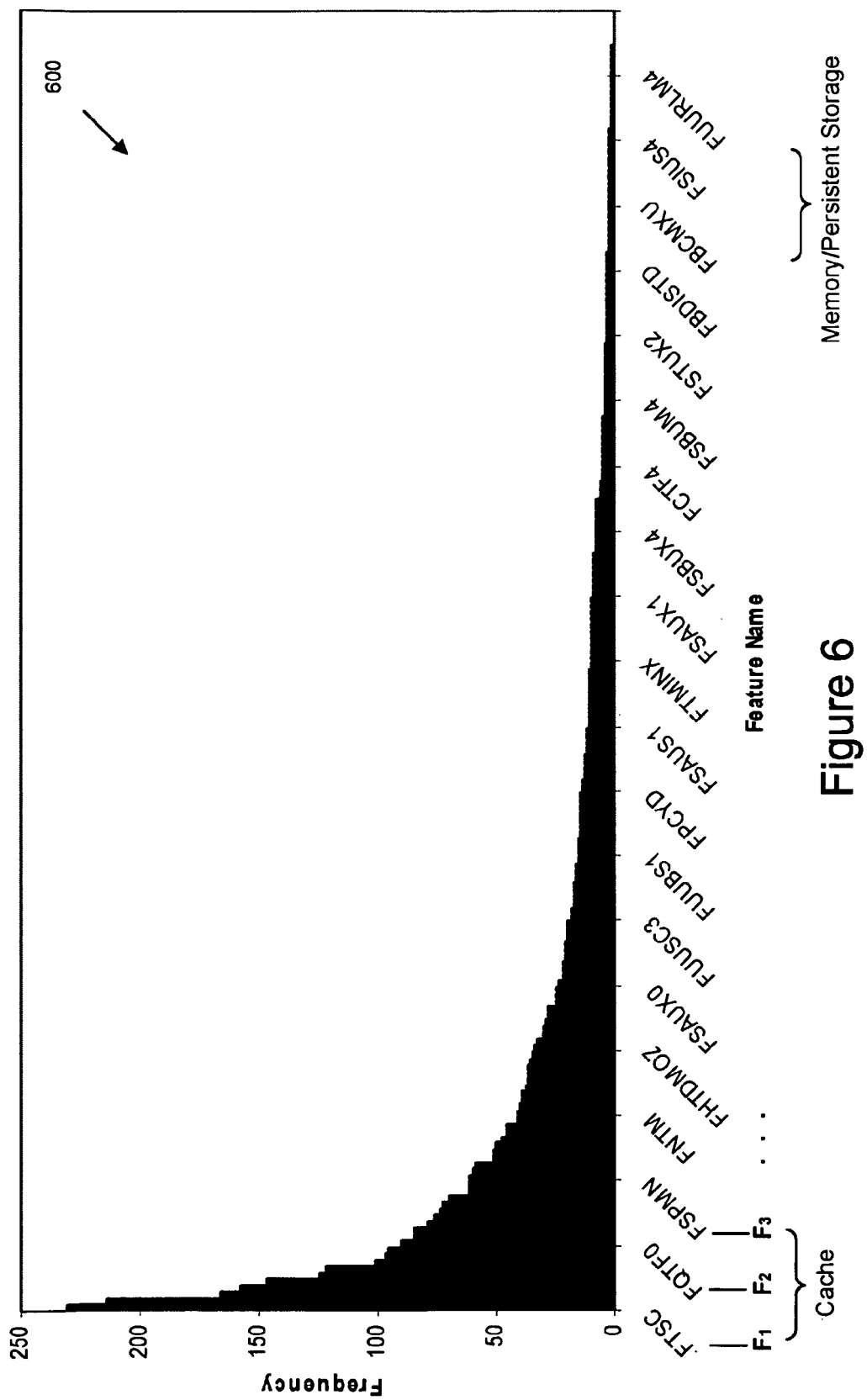
FIG. 6 is a chart that illustrates that the most frequently occurring and/or needed feature values are preferably loaded from cache rather than from memory and/or persistent storage.

In a particular implementation, using the Intel Xeon processor, for example, the value for each feature is stored as a double and a cache line is 64 bytes long. Hence, by storing more frequently accessed features together, retrieval of one frequently accessed featured, advantageously causes retrieval of several frequently accessed features that are optimally stored in proximity or within data locality of each other. Such an embodiment is illustrated by using the chart 600 of FIG. 6. As shown in this figure, more frequent feature values (e.g., the exemplary feature values for F1, F2, and F3) are advantageously stored closer together such that they are more frequently loaded into cache, thereby reducing undesirable latency from cache misses. Moreover, due to their data locality, a load of a frequently used feature value such as F1, advantageously brings other frequently needed feature values such as F2 and/or F3, that may be stored within the same data block, line, and/or data word. Less frequently occurring feature values such as those toward the tail of the distribution 600 are preferably stored together in proximity in data locations that may be loaded less often into cache, and/or that are separate from more frequently needed feature values.

II. Weighted Feature Frequency Analysis

An alternative embodiment exploits decision tree structures to achieve performance gains in addition to the data layout mechanism described above. More specifically, features with equal cumulative frequency of occurrence may differ in the cumulative sum of the heights of their respective set of internal nodes. Stated differently, the location of a feature node within a decision tree affects the probability that the feature node is "touched" during scoring. Nodes that are nearer the top of the decision tree are likely to be touched, while nodes nearer the bottom of the decision tree are less likely to be touched.

Figure 7:
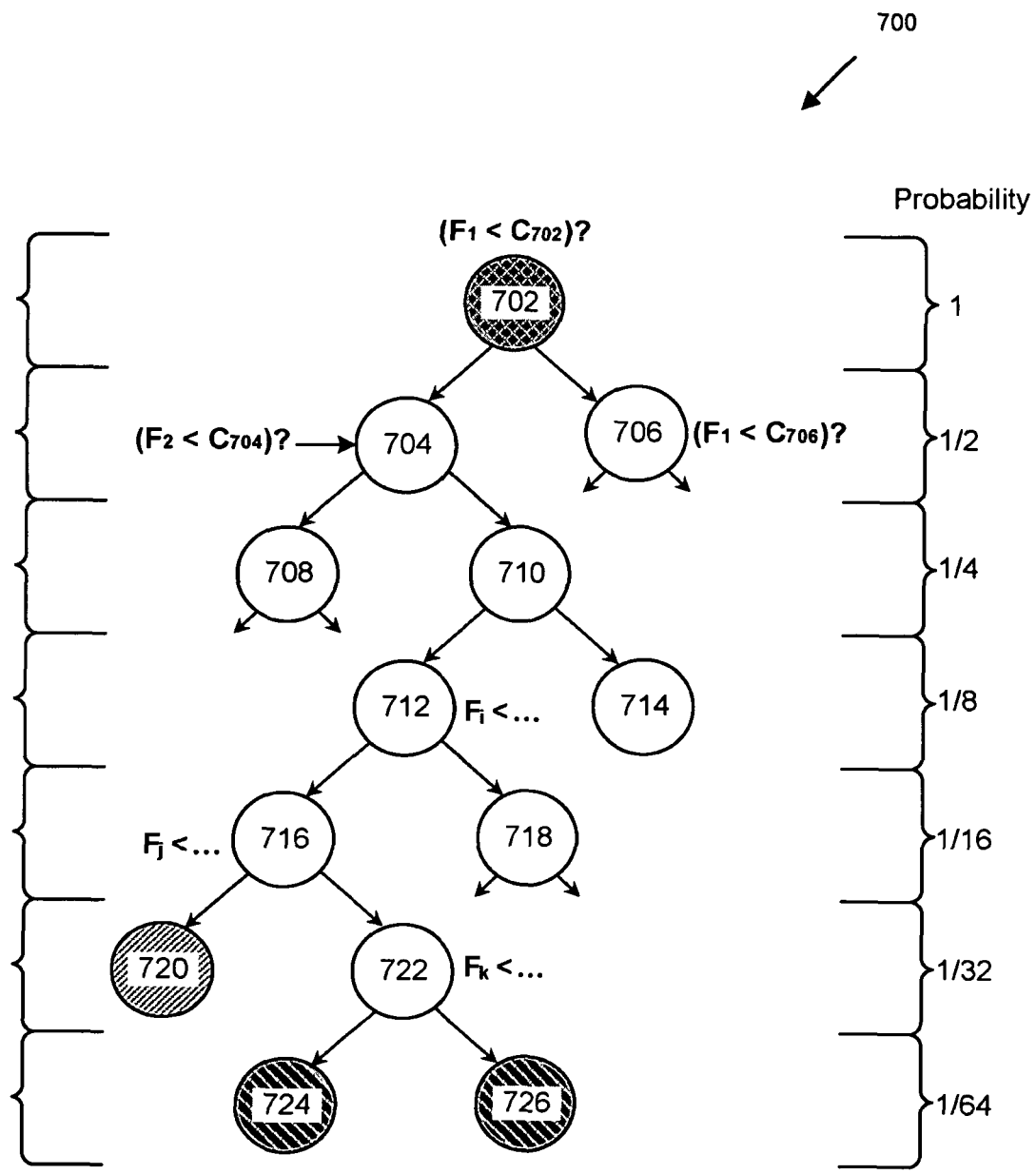
FIG. 7 illustrates a decision tree for weighted frequency analysis.

Accordingly, FIG. 7 illustrates a decision tree 700 for weighted feature frequency analysis. As shown in this figure, a root node 702 and several internal nodes (e.g., 704 and 706), are position in descending layers near the top of the tree. These higher positioned nodes have a higher probability of traversal, or of being touched, than internal nodes (e.g., 718 and 722) and leaf nodes (e.g., 724 and 726) that are positioned in layers that are lower in the decision tree 700. Sample probabilities are given along with illustrative node and/or layers in FIG. 7, however, one of ordinary skill recognizes that these illustrations are intended merely by way of example for the particular decision tree 700, and that other decision trees, other numbers of layers and heights of layers, and/or probabilities, are also contemplated.

Figure 8:
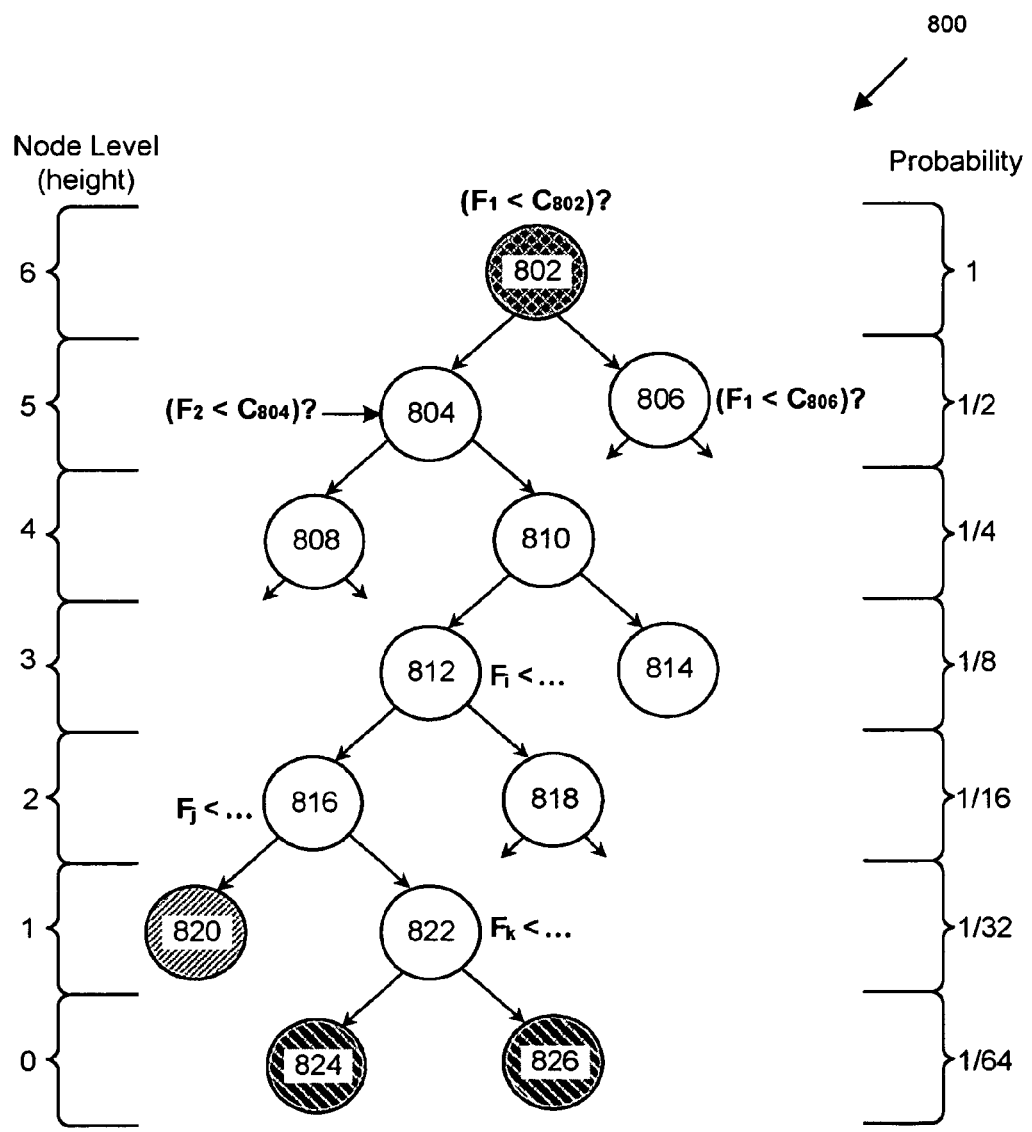
FIG. 8 illustrates a decision tree, where each layer of nodes is assigned a weighting metric.

Some embodiments of the invention advantageously assign different weights to nodes within a decision tree such as, for example, based on the position of the node within the decision tree. FIG. 8 illustrates a particular implementation of a decision tree 800, having weighted nodes. As shown in this figure, nodes near the top of the decision tree 800 are assigned higher weights or a layer "height." The numbers next to each illustrative node layer denotes the height of the corresponding layer of nodes in the decision tree 800. In this implementation, the height of the root node is six, while the height of a lowest leaf node is zero. Alternatively stated, the depth of the root node is zero, while the depth of the lowest ending leaf node is six. One of ordinary skill recognizes differences in the numerical weighting scheme of different embodiments.

Some embodiments advantageously store feature values in an array in descending order of weighted frequency, where the weighted frequency of a feature is computed as follows:

$$\text{Weighted Frequency}(\text{Feature}_i) = \Sigma \text{Height}(\text{Featured})$$

In other words, the weighted frequency of a feature is the cumulative sum of the heights of the nodes corresponding to a given feature in the different trees. Weighted frequency gives higher priority to the features which occur closer to a root node. As mentioned above, the probability of visiting a node decreases exponentially with increasing tree depth (e.g., for nodes of lower height), and some embodiments assign these lower (deeper) nodes lower weights. In contrast, the root of a tree has a depth of zero (e.g., the greatest height). Therefore, it is preferable, from data locality perspective, to store the features corresponding to the frequent visited nodes in proximity with each other. Advantageously, nodes nearest the root node are assigned higher weights, and are further grouped for storage closest together, and furthest from nodes having lower weights, and/or lowest frequencies when applied in conjunction with the embodiments described above. The summation over all the occurrences of a feature encapsulates the performance gain achieved via the technique discussed earlier.

Figure 9:
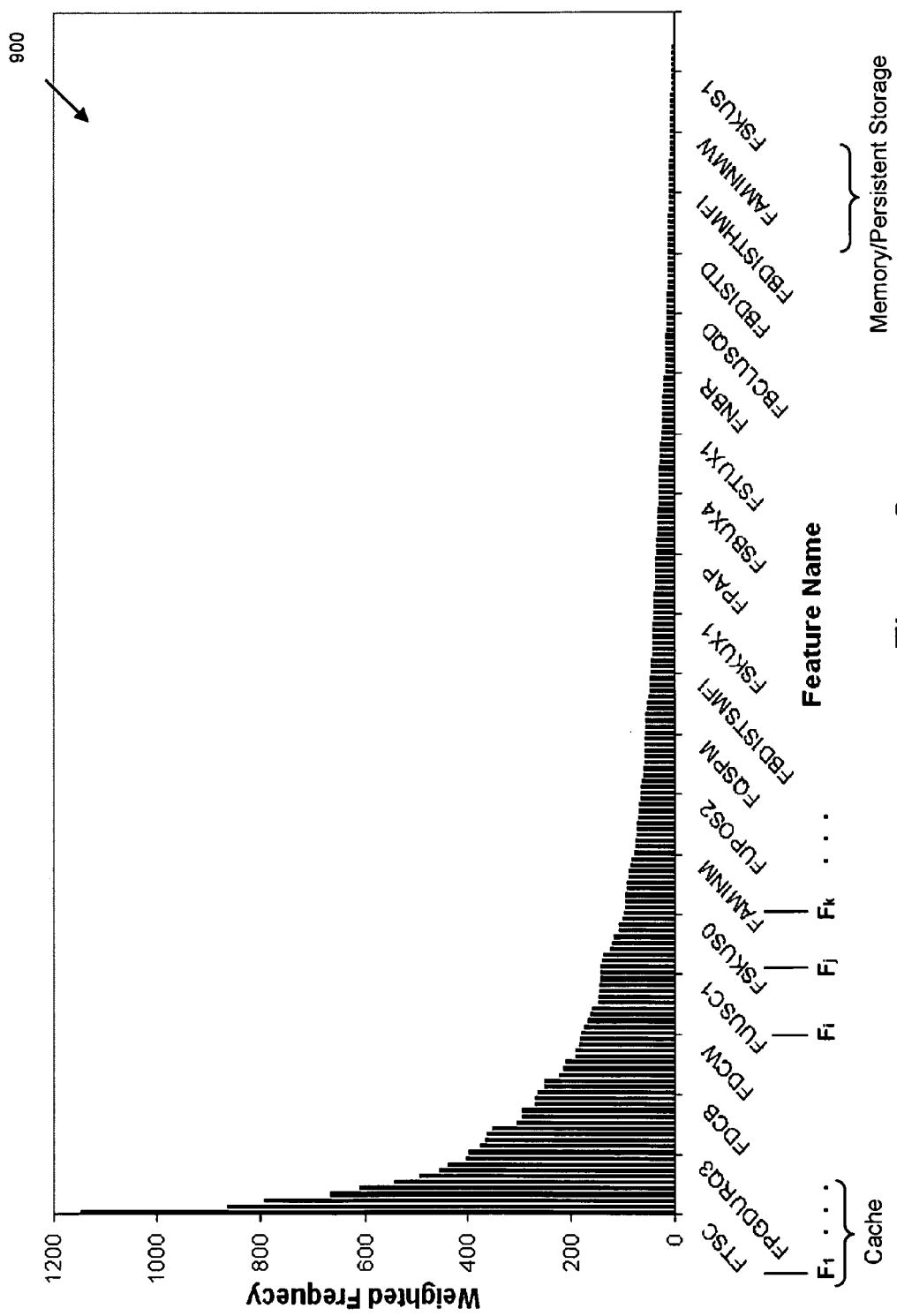
FIG. 9 is a chart that illustrates in descending order the weighted static frequency of the features in a decision tree.

As an illustration, the variation in the weighted frequency of the different features in the first three hundred trees is shown in a chart 900 of FIG. 9. For clarity purposes, the x-axis is labeled every ten ticks, and further, exemplary variables (e.g., F1, Fi, Fj, Fk, . . . ) are arbitrarily indicated for conceptual comparison to the weighted decision tree 800 of FIG. 8. Note that the ordering of the features on the x-axis in FIG. 9 is different from the ordering in FIG. 6, to further emphasize the consequence of incorporating the weights of the internal nodes (based on the height or depth of the nodes and corresponding feature values), while computing the sorting metric. In some implementations, the weighted frequencies are computed separately for the first three hundred trees, than for the remaining trees, for documents having more than three hundred decision trees. In many cases, an early exit condition lies at approximately the 300-th tree, and no further processing of decision trees may be necessary for scoring of the document.

Network, Systems, and/or Computer Readable Media Implementation(s)

Figure 10:
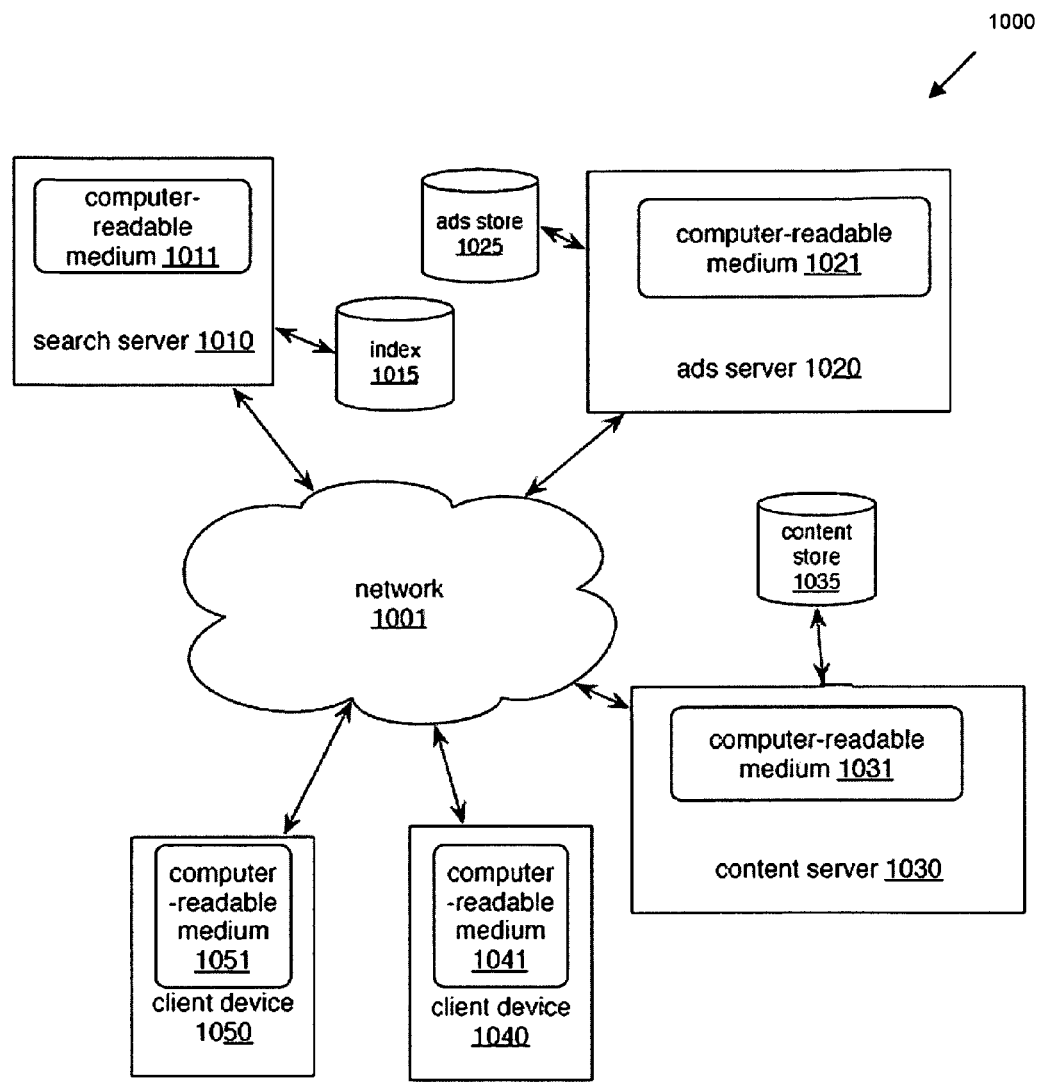
FIG. 10 illustrates a network and/or system implementation of some embodiments.

FIG. 10 illustrates a system 1000 having certain implementations of the embodiments described above. The system 100 includes a search server 1010, an ads server 1020, a content server 1030, client devices 1040 and 1050, and a network 1001. Preferably the network 1001 includes a network of networks such as, for example, the Internet.

The server and client devices 1010, 1020, 1030, 1040, and 1050 include computer-readable media, 1011, 1021, 1031, 1041, and 1051 respectively, such as random access memory, magnetic media, and/or optical media, and the like. The devices 1010, 1020, 1030, 1040, and 1050 execute instructions stored in the media 1011, 1021, 1031, 1041, and 1051. The servers 1010, 1020, and 1030 additionally use index 1015, ads storage 1025, and content storage 1035 respectively. Likely client devices include personal computers, mobile devices, and networked content players. The server(s) and/or client devices may be implemented as networks of computer processors or as single devices.

The search server 1010 receives search ranking module code, preferably asynchronously with serving of search results, and uses search ranking module code to rank documents from index 1015 relative to queries from the client devices. The ads server 1020 receives ads ranking module code, preferably asynchronously with the serving of ads, and uses the ranking module code to rank ads from the ads storage 1025 relative to content from the content server 1030.

Preferably, code for both search and ads ranking modules is based on MLR library code that is optimized via methods consistent with embodiments of the invention. Preferred implementations use MLR libraries in production, and also first use in-built non-intrusive hardware performance counters to identify bottlenecks in an MLR library running on current production hardware.

Advantages

Static Computation at Compile Time

The optimization techniques described herein are compiler-based and thus do not require any algorithmic changes or any hardware changes. The optimization techniques proposed herein employ program static analysis to determine (document) feature frequencies which are in turn used for efficient data layout. The resulting data layout enhances data locality which improves the run-time performance of the machine learning-based ranking library. Further, the proposed optimization techniques are compiler based. Hence, no modification of the application source code is required.

Embodiments are preferably implemented at compile-time, avoiding the need for any algorithmic changes or any hardware changes. In addition, embodiments are not specific to a particular MLR algorithm, thereby permitting their use across a wide variety of ranking problems. Moreover, the optimizations performed are preferably transparent to the designer of the MLR library and the programmer. For example, in some embodiments, input of an MLR library implementation and the target hardware platform produces an optimized MLR library. In some embodiments, however, such input produces a compiled library.

Gains

The data layout techniques proposed in this disclosure speed up the state-of-the-art implementation of a MLR library by about ten percent (10%). The core MLR library is optimized via novel data layout optimization techniques. It is important to note that the performance gain achieved via the proposed techniques is beyond what can be achieved with conventional software prefetching and hardware prefetching that are not aware of data layout. In other words, the plain, standard software prefetching that is conventionally available was enabled, and the two-level hardware prefetchers of a conventional micro-architecture were operational, while evaluating the techniques of the various embodiments described herein.

A. Results for Static Frequency Analysis

Results, on a real machine having, for example, an Intel quad-core Xeon processor, show that the optimizations described above yielded about five percent performance gain or speedup. The gain was measured using the hardware performance counter CPU_CLK_UNHALTED.CORE. Note that the five percent gain is over an optimized machine learning-based ranking library with conventional software prefetching. The gain is substantially higher over an un-optimized MLR library.

Generally, dynamic feature-frequency analysis is more accurate than static feature-frequency analysis discussed above. Dynamic analysis, however, is strongly coupled with an input query log thereby necessitating re-evaluation of the feature frequencies every time the query log changes. In contrast, the static frequency analysis described above does not suffer from this limitation. There has also been work in the context of decision tree restructuring. For example, some researchers have proposed two tree restructuring-based techniques, ITI and DMTI, for decision tree induction. Likewise, there has been work done in the context of learning of decision trees. The foregoing prior research, however, is orthogonal to the problem addressed in this disclosure. Moreover, although there exists prior work in software prefetching, the prior work does not address optimization of machine-learning based document ranking algorithms.

B. Results for Weighted Frequency Analysis

On a conventional machine having an Intel quad-core Xeon processor, results show that weighted-frequency based data layout and software prefetching yielded about a five percent performance gain over frequency based data layout and software prefetching discussed above, and about ten percent performance gain over conventional software prefetching.

C. Summary

Overall, the reduction in the query processing time improves a key bottom line, cost per query, which enables processing of a larger number of queries per dollar of investment. Furthermore, the gains achieved are increased since query processing which implicitly invokes MLR is done over a cluster comprising tens of thousands of nodes. Thus, from a system-wide perspective, the impact of optimizing MLR via the proposed techniques would be much higher.

Generally, the optimization techniques proposed herein are targeted towards a state-of-the-art array-based implementation of a machine learning-based ranking library, as opposed to a nested if-then-else based implementation. The overall optimization methodology proposed herein is decoupled from the specific machine learning-based ranking algorithm used. More specifically, the design and micro-architecture aware optimization of the MLR library are done separately, thereby enhancing overall productivity. Notably, micro-architecture aware optimization of a MLR library has not conventionally been addressed in the art.

Micro-Architecture Aware Optimization

The proposed optimization techniques exploit support for prefetching in the instruction set architecture (ISA). The feature frequency based data layout optimization(s) described above augment the efficacy of software prefetching. In contrast, existing approaches have been at the algorithmic level, and are not aware of the underlying micro-architecture.

The results described herein may be advantageously achieved by using a widely-used compiler (e.g., gcc version 3.4.4), conventional hardware such as an Intel quad-core Xeon processor, a query log actually commercially used in production, and a production-strength implementation of a machine learning-based ranking (MLR) library.

Document ranking accounts for a large portion (about 14%) of the total query processing time. Stated differently, the MLR library has about 14% coverage. This coverage determination of the MLR library herein was obtained by using a set of in-built non-intrusive hardware performance counters. Accordingly, optimization of the MLR library is a highly effective strategy to reduce query processing time. In view of the foregoing, embodiments of the invention advantageously improve a key bottom line in terms of cost per query ($/query), and further enable processing of larger numbers of queries per dollar of investment such as, for example, across tens of thousands of machines. Reduction in query processing time further reduces costs per query served, which enables processing of more queries per dollar of investment. Furthermore, the gains achieved are compounded because query processing typically occurs over a cluster of many servers. From a system-wide perspective, the impact of optimizing MLR via the methods described herein is a significant improvement. In addition, improved query serving speed corresponds to improved user experience.

Although the techniques are described above in the online search and advertising context, the techniques are also applicable in any number of different network systems. The techniques described herein may be implemented in digital electronic circuitry, or in computer hardware, firmware, software, or in combinations of them. The techniques may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps of the techniques described herein may be performed by one or more programmable processors executing a computer program to perform functions of the invention by operating on input data and generating output. Method steps may also be performed by, and apparatus of the invention may be implemented as, special purpose logic circuitry, e.g., an FPGA (field programmable gate array) or an ASIC (application-specific integrated circuit). Modules may refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, the techniques described herein may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer (e.g., interact with a user interface element, for example, by clicking a button on such a pointing device). Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

The techniques described herein may be implemented in a distributed computing system that includes a back-end component, e.g., as a data server, and/or a middleware component, e.g., an application server, and/or a front-end component, e.g., a client computer having a graphical user interface and/or a Web browser through which a user may interact with an implementation of the invention, or any combination of such back-end, middleware, or front-end components. The components of the system may be interconnected by any form or medium of digital data communication, e.g., a communication network. Examples of communication networks include a local area network ("LAN") and a wide area network ("WAN"), e.g., the Internet, and include both wired and wireless networks.

The computing system may include clients and servers. A client and server are generally remote from each other and typically interact over a communication network. The relationship of client and server arises by virtue of computer programs running on the respective computers and having a client-server relationship to each other.

One of ordinary skill recognizes and and/or all of the above implemented as computer readable media. Other embodiments are within the scope of the following claims. The following are examples for illustration only and not to limit the alternatives in any way. The techniques described herein may be performed in a different order and still achieve desirable results.

While the invention has been described with reference to numerous specific details, one of ordinary skill in the art will recognize that the invention may be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of optimization for a search, the method comprising:
   receiving, by a computer, a first decision tree comprising a plurality of nodes, each node for comparing a feature value to a threshold value, the nodes comprising a root node, a plurality of internal nodes, and at least one leaf node;
   determining, by the computer, the frequency of a first feature within the first decision tree;
   determining, by the computer, the frequency of a second feature within the first decision tree;
   ordering, by the computer, the features based on the determined frequencies;
   storing, by the computer, the ordering such that values of features having higher frequencies that are retrieved more often and occur closer to the root node of the first decision tree are grouped into memory blocks that are closely packed and furthest from memory blocks that store values of features having lower frequencies and occur further away from the root node within the first decision tree, the feature values are associated with features of a web page;
   traversing the first decision tree in a direction based on the comparison of the feature value to the threshold value associated with the root node and the internal nodes; and
   determining a score for the web page upon reaching a leaf node during the traversing of the first decision tree.

2. The method of claim 1, wherein the first decision tree is derived from a machine learning-based ranking algorithm.

3. The method of claim 1, further comprising a set of decision trees including the first decision tree, the method further comprising determining the frequency of the first feature in the set of decision trees.

4. The method of claim 1, wherein the determined frequencies comprising static frequencies at compile time, the ordering is performed at the compile time.

5. The method of claim 1, wherein the storing comprising grouping values for the higher frequency features into memory blocks that are closely packed such that higher frequency feature values are loaded more often into cache from memory.

6. The method of claim 1, further comprising compiling the nodes of the first decision tree into a run time algorithm such that the higher frequency feature values are retrieved at run time by prefetching.

7. The method of claim 1, wherein the feature values are used to rank the web page document based on a calculated relevance to a search query.

8. A method of optimization for a search, the method comprising:
   receiving a first decision tree comprising a plurality of nodes, each node for comparing a feature value to a threshold value;
   weighting the nodes within the first decision tree such that nodes are weighted higher as the nodes are closer to a root node;
   determining the weighted frequency of a first feature within the first decision tree;
   determining the weighted frequency of a second feature within the first decision tree;
   ordering, by a computer, the features based on the determined weighted frequencies; and
   storing the ordering such that values of features having higher weighted frequencies that are retrieved more often occur closer to the root node of the first decision tree are stored into memory blocks that are closely packed and furthest from memory blocks that store values of features having lower weighted frequencies and occur further away from the root node within the first decision tree;
   traversing the first decision tree in a direction based on the comparison of the feature value to the threshold value associated with the root node and the internal nodes; and
   determining a score for the web page upon reaching a leaf node during the traversing of the first decision tree.

9. The method of claim 8, the first decision tree derived from a machine learning-based ranking algorithm.

10. The method of claim 8, further comprising a set of decision trees including the first decision tree, the method further comprising:
    weighting the nodes for each decision tree; and
    determining the weighted frequency of the first feature in the set of decision trees.

11. The method of claim 8, the determined frequencies comprising static frequencies at compile time, the ordering performed at compile time.

12. The method of claim 8, wherein the higher frequency feature values are loaded more often into cache from memory.

13. The method of claim 8, further comprising compiling the nodes of the first decision tree into a run time algorithm such that the higher frequency feature values are retrieved at run time by prefetching.

14. The method of claim 8, the first decision tree comprising a root node, a plurality of internal nodes, and at least one leaf node, wherein the root node and each internal node comprises a binary decision node, wherein the decision comprises a Boolean expression of whether a particular feature value $F_n$ is less than the threshold value for the node, wherein if the Boolean expression is true then the tree is traversed in the direction of one of two next nodes within the first decision tree.

15. The method of claim 8, wherein the features within the first decision tree are representative of the features of a web page document available for searching online, wherein the feature values are used to rank the web page document based on a calculated relevance to a search query.

16. The method of claim 8, the first decision tree comprising one root node, fifteen internal nodes, and sixteen leaf nodes organized into layers having node weights, wherein the root node comprises the highest weight layer and one or more leaf nodes comprise the lowest weight layer.

17. A non-transitory computer readable medium storing a program for optimization for a search, the computer readable medium having sets of executed by a computer for:
    receiving a first decision tree comprising a plurality of nodes, each node for comparing a feature value to a threshold value, the nodes comprising a root node, a plurality of internal nodes, and at least one leaf node;
    determining the frequency of a first feature within the first decision tree;

determining the frequency of a second feature within the first decision tree;

ordering the features based on the determined frequencies;

storing the ordering such that values of features having higher frequencies that are retrieved more often and occur closer to the root node of the first decision tree are stored into memory blocks that are closely packed and furthest from memory blocks that store values of features having lower frequencies and occur further away from the root node within the first decision tree, the feature values are associated with features of a web page;

traversing the first decision tree in a direction based on the comparison of the feature value to the threshold value associated with the root node and the internal nodes; and determining a score for the web page upon reaching a leaf node during the traversing of the first decision tree.

18. An apparatus comprising a processor and a non-transitory computer readable medium storing a program for optimization for a search by the processor, the computer readable medium having logic executable by the processor for:

receiving a first decision tree comprising a plurality of nodes, each node for comparing a feature value to a threshold value;

weighting the nodes within the first decision tree such that nodes are weighted higher as the nodes are closer to a root node;

determining the weighted frequency of a first feature within the first decision tree;

determining the weighted frequency of a second feature within the first decision tree;

ordering the features based on the determined weighted frequencies; and storing the ordering such that values of features having higher frequencies that are retrieved more often occur closer to the root node of the first decision tree are stored into memory blocks that are closely packed and furthest from memory blocks that store values of features having lower frequencies and occur further away from the root node within the first decision tree, the feature values are associated with features of a web page;

traversing the first decision tree in a direction based on the comparison of the feature value to the threshold value associated with the root node and the internal nodes; and determining a score for the web page upon reaching a leaf node during the traversing of the first decision tree.

\* \* \* \* \*